United States Patent
Wang et al.

(10) Patent No.: US 7,388,060 B2
(45) Date of Patent: Jun. 17, 2008

(54) CATALYST COMPONENT FOR OLEFIN (CO)POLYMERIZATION, PREPARATION THEREOF, A CATALYST COMPRISING THE SAME AND USE THEREOF

(75) Inventors: Zhiwu Wang, Beijing (CN); Zhong Tan, Beijing (CN); Zhengyang Guo, Beijing (CN); Kai Zhang, Beijing (CN); Tianyi Li, Beijing (CN); Jun Xiao, Beijing (CN); Peng Kou, Beijing (CN); Liang Pan, Beijing (CN); Li'an Yan, Beijing (CN); Xingbo Li, Beijing (CN); Huijuan Xu, Beijing (CN); Haixiang Cui, Beijing (CN); Yu Wang, Beijing (CN); Ling Yang, Beijing (CN)

(73) Assignees: China Petroleum & Chemical Corporation, Beijing (CN); Beijing Research Institute of Chemical Industry, Beijing (CN)

( * ) Notice: Subject to any disclaimer, the term of this patent is extended or adjusted under 35 U.S.C. 154(b) by 151 days.

(21) Appl. No.: 11/324,339

(22) Filed: Jan. 4, 2006

(65) Prior Publication Data

US 2007/0155616 A1   Jul. 5, 2007

(51) Int. Cl.
*C08F 4/42* (2006.01)
(52) U.S. Cl. .............. 526/124.2; 526/124.3; 526/348; 502/103; 502/125

(58) Field of Classification Search .............. 526/124.2, 526/124.3, 348; 502/103, 125
See application file for complete search history.

(56) References Cited

U.S. PATENT DOCUMENTS

| | | | |
|---|---|---|---|
| 4,392,983 A * | 7/1983 | Hartshorn et al. | 502/107 |
| 4,477,587 A | 10/1984 | Band | |
| 4,814,312 A | 3/1989 | Murata et al. | |
| 5,382,557 A * | 1/1995 | Masi et al. | 502/107 |

FOREIGN PATENT DOCUMENTS

| | | |
|---|---|---|
| CN | 1176258 A | 3/1998 |
| CN | 1552743 A | 12/2004 |
| CN | 1681853 A | 10/2005 |

* cited by examiner

*Primary Examiner*—Ling-Sui Choi
(74) *Attorney, Agent, or Firm*—Birch, Stewart, Kolasch & Birch, LLP

(57) ABSTRACT

The invention relates to a catalyst component for olefin (co)polymerization, to preparation thereof, to a catalyst comprising the same, and to use thereof in olefin (co) polymerization. The catalyst component of the invention comprises magnesium, titanium, halogen, inner electron donor compound, and alkoxy group derived from a surface modifier, wherein the content of the alkoxy group derived from the surface modifier is in a range of from 0.01 to 3 percent by weight, based on the weight of the catalyst component.

19 Claims, No Drawings

CATALYST COMPONENT FOR OLEFIN (CO)POLYMERIZATION, PREPARATION THEREOF, A CATALYST COMPRISING THE SAME AND USE THEREOF

TECHNICAL FIELD OF THE INVENTION

The present invention relates to a catalyst component for olefin (co)polymerization, to preparation thereof, to a catalyst comprising the same, and to use thereof in olefin (co)polymerization.

BACKGROUND OF THE INVENTION

High-activity supported Ziegler-Natta catalysts are widely used in olefin polymerization. A conventional process for preparing such high-activity supported catalysts is co-precipitating process, wherein a magnesium halide is dissolved in a solvent system to form a homogeneous solution, which is then treated with titanium halide to precipitate active magnesium halide, and at the same time and/or thereafter, active titanium component is supported on the active magnesium halide. U.S. Pat. No. 4,784,983 discloses a catalyst system for olefin (co)polymerization comprising (a) a titanium-containing solid catalyst component, (b) an alkyl aluminum compound, and (c) an organic silicon compound. The (a) component is obtained by dissolving a magnesium halide in a solvent mixture consisting of an organic epoxy compound and an organic phosphorus compound to form a homogeneous solution; mixing the solution with a titanium tetrahalide or its derivatives; precipitating a solid in the presence of an auxiliary precipitant selected from the group consisting of carboxylic acid anhydrides, carboxylic acids, ethers and ketones; treating the solid with a polycarboxylic acid ester to support the polycarboxylic acid ester onto the solid; and treating separated solid with titanium tetrahalide or a mixture of titanium tetrahalide and an inert diluent. When used in propylene polymerization, the catalyst exhibits high activity, and the resultant polymer has a high isotacticity and a high bulk density.

Patent Application CN1229092 discloses a process for preparing a catalyst similar to that of U.S. Pat. No. 4,784,983, wherein in the step of dissolving magnesium halide to form a homogeneous solution, ethanol is added to modify the magnesium halide. Such prepared catalyst exhibits greatly enhanced activity when used in ethylene polymerization, however, said catalyst is not applicable to the production of polypropylene and copolymer of ethylene and propylene.

SUMMARY OF THE INVENTION

An object of the invention is to provide a catalyst component for olefin (co)polymerization.

Another object of the invention is to provide a catalyst for olefin (co)polymerization.

Still another object of the invention is to provide a process for preparing the catalyst component for olefin (co)polymerization according to the invention.

Still another object of the invention is to provide a process for (co)polymerizing olefin(s).

Still another object of the invention is to provide use of the catalyst for olefin (co)polymerization according to the invention.

When used in polymerization of propylene or copolymerization of propylene with ethylene, the catalyst according to the invention exhibits high catalytic activity and high impurity resistant ability; the catalyst has good particle morphology and narrow particle size distribution, and the mean particle size is adjustable in a range of from 5 to 25 microns; the catalyst is applicable to various polymerization processes such as slurry process, bulk process, gas process, etc.; the resultant polymers have broader molecular weight distribution, Mw/Mn, better particle morphology, and less fines. The excellent impurity resistant ability of the catalyst according to the invention may effectively reduce the production cost of resins. The catalyst according to the invention is especially suitable for the production of impact resistant propylene copolymer and BOPP film grade resin.

DETAILED DESCRIPTION OF THE PREFERRED EMBODIMENTS

In the first aspect, the present invention relates to a catalyst component for olefin (co)polymerization comprising magnesium, titanium, halogen, inner electron donor compound, and alkoxy group derived from a surface modifier, wherein the content of the alkoxy group derived from the surface modifier is larger than 0 but less than 5 percent by weight, based on the weight of the catalyst component.

As used herein, the term "catalyst component" intends to means main catalyst component or procatalyst, which, together with a cocatalyst component and an optional external electron donor, constitutes the catalyst for olefin (co) polymerization according to the invention.

The catalyst component according to the invention is obtainable by a process comprising the steps of:

i) dissolving a magnesium compound in a solvent mixture consisting of an organic epoxy compound, an organic phosphorus compound and an optional inert diluent, to form a homogeneous solution;

ii) treating the above solution with a titanium compound in the presence of an auxiliary precipitant, and optionally in the presence of at least one inner electron donor compound, to precipitate a solid precipitate containing magnesium and titanium;

iii) treating the solid precipitate with at least one surface modifier, and at the same time or subsequently, supporting at least one titanium compound and at least one inner electron donor compound thereon, to form a treated solid precipitate; and iv) washing the treated solid precipitate with an inert diluent;

wherein the surface modifier is selected from the group consisting of alcohols, and wherein the auxiliary precipitant is at least one selected from the group consisting of carboxylic acid anhydrides, carboxylic acids, ethers and ketones.

According to a preferred embodiment, the catalyst component according to the invention may be prepared by: (1) dissolving a magnesium compound in a solvent mixture consisting of an organic epoxy compound, an organic phosphorus compound and an optional inert diluent while stirring, to form a homogeneous solution; dropping a titanium compound into the homogeneous solution of the magnesium compound, alternatively, dropping the homogeneous solution of the magnesium compound into a titanium compound, in the presence of an auxiliary precipitant at a temperature of from −30 to 60° C., preferably from −30 to 5° C.; then heating the reaction mixture to a temperature of from 60 to 110° C. and maintaining the temperature for 0.5 to 8 hours with stirring; then filtering off the mother liquid, and washing the residue solid with an inert diluent to give a solid containing magnesium and titanium; (2) suspending the above solid in an inert diluent, and then adding a surface modifier and a titanium compound at a temperature of from −30 to 50° C.; heating the suspension to a temperature of from 10 to 80° C. with stirring, and adding an inner electron donor either as one batch or as several batches added at different temperatures; then allowing the reaction to continue at a temperature of from 100 to 130° C. for 0.5 to 8 hours; filtering off the liquid, and further treating the solid with a mixture of the titanium compound and the inert diluent for one or two times; and after filtering off the liquid, washing the solid with an inert diluent, to give a solid titanium-containing catalyst component.

The magnesium compound uses in the present invention is selected from the group consisting of magnesium dihalides, complexes of magnesium dihalide with water or alcohols, derivatives of magnesium dihalide wherein a halogen atom is replaced with a hydrocarbyl group or a hydrocarbyloxy group, and mixtures thereof. Examples of the magnesium compound include, but are not limited to, magnesium dichloride, magnesium dibromide, magnesium diiodide, with the preferred being magnesium dichloride.

The organic epoxy compound used in the present invention is at least one selected from the group consisting of oxides of aliphatic olefins and diolefins, oxides of halogenated aliphatic olefins and diolefins, glycidyl ethers, and cyclic ethers, having from 2 to 8 carbon atoms. Examples thereof include, but are not limited to, ethylene oxide, propylene oxide, butylene oxide, butadiene oxide, butadiene dioxide, epoxy chloropropane, glycidyl methyl ether, diglycidyl ether.

The organic phosphorus compound used in the present invention is selected from the group consisting of hydrocarbyl esters and halohydrocarbyl esters of ortho-phosphoric acid and phosphorous acid. Examples thereof include, but are not limited to, trimethyl phosphate, triethyl phosphate, tributyl phosphate, triphenyl phosphate, trimethyl phosphite, triethyl phosphite, tributyl phosphite, and triphenyl phosphite.

The auxiliary precipitant used in the present invention is selected from the group consisting of carboxylic acids, carboxylic acid anhydrides, ethers, ketones, and mixture thereof. Examples thereof include, but are not limited to, acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, and dipentyl ether.

The surface modifier used in the invention is selected from the group consisting of alcohols, preferably linear alcohols having 1 to 8 carbon atoms and isomer alcohols thereof, such as methanol, ethanol, propanol, isopropanol, butanol, isobutanol, octanol, isooctanol, and mixtures thereof.

The titanium compounds useful in the present invention have a general formula $Ti(OR)_{4-n}X_n$, in which R is a $C_1$-$C_{14}$ aliphatic hydrocarbyl or aromatic hydrocarbyl being identical or different, X is halogen, and n is an integer of from 0 to 4. Examples include titanium tetrachloride, titanium tetrabromide, titanium tetraiodide, tetrabutyl titanate, tetraethyl titanate, titanium monochloride triethoxide, titanium dichloride diethoxide, titanium trichloride monoethoxide, and mixtures thereof, with the preferred being titanium tetrachloride. The titanium compound used in the step ii) of the above preparation process may be identical to or different from that used in the step iii).

In the preparation of the catalyst component of the present invention, at least one inner electron donor compound is used. Use of inner electron donor compounds in the catalysts for, for example, propylene polymerization is well known in the art, and all commonly used inner electron donor compounds, such as polycarboxylic acids, esters of monocarboxylic acids and polycarboxylic acids, anhydrides, ketones, mono-ethers and poly-ethers, and amines, can be used in the present invention. The examples of inner electron-donor compounds useful in the invention include, but are not limited to:

(i) Aliphatic or aromatic polybasic carboxylic acid ester compounds, such as phthalates, malonates, succinates, glutarates, adipates, pivalates, maleates, naphthalene dicarboxylates, trimellitates, benzene-1,2,3-tricarboxylic acid esters, pyromellitates and carbonates. Examples include diethyl malonate, dibutyl malonate, dibutyl adipate, diethyl adipate, diethyl phthalate, diisobutyl phthalate, di-n-butyl phthalate, diisooctyl phthalate, diethyl 2,3-diisopropylsuccinate, diisobutyl 2,3-diisopropylsuccinate, di-n-butyl 2,3-diisopropylsuccinate, dimethyl 2,3-diisopropylsuccinate, diisobutyl 2,2-dimethylsuccinate, diisobutyl 2-ethyl-2-methylsuccinate, diethyl 2-ethyl-2-methylsuccinate, diethyl maleate, di-n-butyl maleate, diethyl naphthalene dicarboxylate, dibutyl naphthalene dicarboxylate, triethyl trimellitate, tributyl trimellitate, benzene-1,2,3-tricarboxylic acid triethyl ester, benzene-1,2,3-tricarboxylic acid tributyl ester, tetraethyl pyromellitate, tetrabutyl pyromellitate, etc.

(ii) Polyol ester compounds, such as polyol esters of the general formula (I),

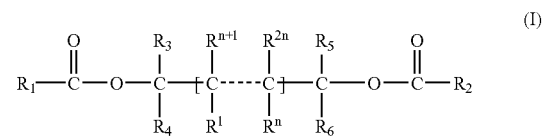

wherein $R_1$ to $R_6$ and $R^1$ to $R^{2n}$, which may be identical or different, are hydrogen, halogen, or optionally substituted linear or branched $C_1$-$C_{20}$ alkyl, $C_3$-$C_{20}$ cycloalkyl, $C_6$-$C_{20}$ mono-ring or multi-ring aryl, $C_7$-$C_{20}$ alkylaryl, $C_7$-$C_{20}$ arylalkyl, $C_2$-$C_{10}$ alkenyl, or $C_2$-$C_{10}$ ester group, with the proviso that $R_1$ and $R_2$ are not hydrogen, $R_3$ to $R_6$ and $R^1$ to $R^{2n}$ optionally comprise one or more heteroatoms, which are selected from the group consisting of nitrogen, oxygen, sulfur, silicon, phosphorus and halogen, replacing carbon or hydrogen or the both, and one or more of $R_3$ to $R_6$ and $R^1$ to $R^{2n}$ may be linked to form a ring; and n is an integer ranging from 0 to 10.

Such polyol ester compounds are disclosed in detail in WO 03/068828 and WO 03/068723, all relevant contents of which are incorporated herein by reference.

Among said polyol ester compounds, the preferred is compounds of the general formula (II),

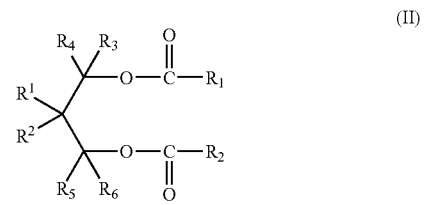

wherein $R_1$ to $R_6$ and $R^1$ to $R^2$ are as defined in the general formula (I).

In the polyol ester compounds represented by the general formulae (I) and (II), it is preferred that $R_3$, $R_4$, $R_5$ and $R_6$ are not simultaneously hydrogen, and at least one of $R_3$, $R_4$, $R_5$ and $R_6$ is selected from the group consisting of halogen, $C_1$-$C_{10}$ linear or branched alkyl, $C_3$-$C_{10}$ cycloalkyl, $C_6$-$C_{10}$ aryl, $C_7$-$C_{10}$ alkylaryl or arylalkyl.

In addition, the compounds of the general formula (I) further include compounds of the general formula (III):

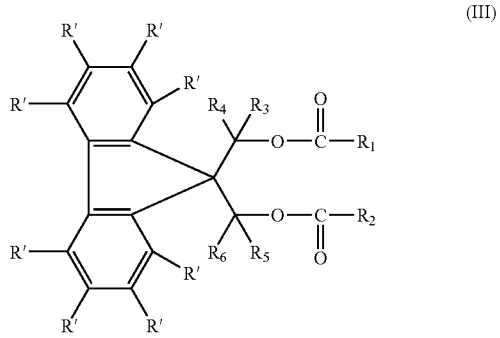

(III)

wherein groups $R_1$-$R_6$ are as defined in the general formula (I); R's are identical or different, and represent hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl, or $C_7$-$C_{20}$ arylalkyl.

In the polyol ester compounds represented by the formulae (I), (II) and (III), it is preferred that at least one of $R_1$ and $R_2$ is selected from the group consisting of phenyl, halophenyl, alkylphenyl and haloalkyl-phenyl.

An example of the polyol ester compounds as electron donor compound is 1,3-pentylene dibenzoate.

(iii) Diether compounds, such as 1,3-diether compounds represented by the general formula (IV),

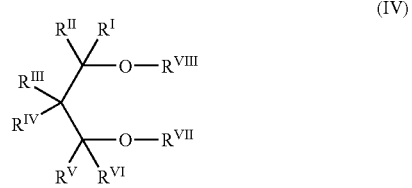

(IV)

wherein $R^I$, $R^{II}$, $R^{III}$, $R^{IV}$, $R^V$ and $R^{VI}$, which may be identical or different, are selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl, and $R^{VII}$ and $R^{VIII}$, which may be identical or different, are selected from the group consisting of linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl; and groups $R^I$ to $R^{VI}$ may link each other to form a ring. The preferred is those 1,3-diethers wherein $R^{VII}$ and $R^{VIII}$ are $C_1$-$C_4$ alkyl. These 1,3-diether compounds are disclosed in Chinese Patent ZL89108368.5 and CN11411285A, the relevant contents of which are incorporated herein by reference.

As used herein, the term "inner electron donor compound" does not include alcohols used as surface modifier in the invention.

There is not specific limitation to the inert diluent used in the present invention as long as it does not interfere in the proceeding of the process. However, alkane solvents, such as hexane, heptane, octane, decane, and the like, and arene solvents, such as benzene, toluene, xylene, and the like are preferred. The inert diluents used in the individual steps of the above preparation process may be identical to or different from each other.

In the preparation of the catalyst component according to the invention, the raw materials are used in the amounts of from 0.2 to 10 moles, preferably from 0.5 to 4 moles for the organic epoxy compound; from 0.1 to 3 moles, preferably from 0.3 to 1 mole for the organic phosphorus compound; from 0.03 to 1 mole, preferably from 0.05 to 0.4 moles for the auxiliary precipitant; from 0.005 to 15 moles, preferably from 0.06 to 10 moles, more preferably from 0.1 to 3 moles, and most preferably from 0.2 to 1.5 moles for the surface modifier; from 0.5 to 20 moles, preferably from 1 to 15 moles for the titanium compound; and from 0.005 to 10 moles, preferably from 0.01 to 2 moles for the inner electron donor compound, based on per mole of the magnesium compound.

The catalyst component according to the invention has essentially the following composition: titanium, 1 to 10 wt %; magnesium, 10 to 20 wt %; halogen, 40 to 70 wt %; electron donor compound, 5 to 25 wt %; alkoxy group derived from the surface modifier, larger than 0 but less than 5 wt %; and inert diluent, 0 to 10 wt %, based on the total weight of the catalyst component.

In the catalyst component according to the invention, the content of the alkoxy group derived from the surface modifier is larger than 0 but less than 5 wt %, preferably from 0.01 to 3 wt %, more preferably from 0.02 to 2 wt %, still more preferably from 0.05 to 1.5 wt %, and most preferably from 0.1 to 1 wt %, as measured according to a process detailedly described hereinafter. As used herein, the term "alkoxy group derived from the surface modifier" does not include alkoxy moiety of esters as inner electron donor compounds contained in the catalyst component.

In the second aspect, the present invention relates to a catalyst for olefin (co)polymerization comprising
A) the catalyst component according to the invention;
B) an organic aluminum compound; and
C) optionally, an external electron donor compound.

The organic aluminum compounds used as the component B) of the catalyst according to the invention have a general formula $AlR_nX_{3-n}$, in which R is hydrogen or hydrocarbyl having from 1 to 20 carbon atoms, especially alkyl, aralkyl or aryl; X is halogen, especially chlorine or bromine; and n is a value meeting the condition of $0<n\leq3$. Examples include trimethyl aluminum, triethyl aluminum, triisobutyl aluminum, trioctyl aluminum, diethyl aluminum hydride, diisobutyl aluminum hydride, and alkyl aluminum halides such as diethyl aluminum chloride, di-isobutyl aluminum chloride, ethyl aluminum sesquichloride, ethyl aluminum dichloride, with triethyl aluminum and triisobutyl aluminum being preferred.

In the catalyst according to the invention, the molar ratio of aluminum in the component B) to the titanium in the component A) is in a range of from 5 to 5000, and preferably from 20 to 500.

The optional component C) of the catalyst according to the invention can be conventional external electron donor compounds, such as organic silicon compounds having a general formula $R_nSi(OR^1)_{4-n}$, in which n is an integer of from 0 to 3, R and $R^1$, which are identical or different, are alkyl, cycloalkyl, aryl, or haloalkyl, and R may also be halogen or hydrogen atom. Examples include, but are not limited to, trimethyl methoxysilane, trimethyl ethoxysilane, trimethyl phenoxysilane, dimethyl dimethoxysilane, dimethyl diethoxysilane, methyl cyclohexyl diethoxysilane, methyl cyclohexyl dimethoxysilane, diphenyl dimethoxysilane, diphenyl diethoxysilane, phenyl trimethoxysilane, phenyl triethoxysilane, and vinyl trimethoxysilane. The component C) may or may not be used during the polymerization, depending on the kind of the olefin and/or the kind of the inner electron donor compound.

The catalyst according to the invention can be used in the polymerization of ethylene or copolymerization of ethylene and other α-olefin, such as propylene, 1-butene, 4-methyl-1-pentene, 1-hexene, 1-pentene, 1-octene, and the like. The catalyst according to the invention can also be used in the polymerization of propylene or copolymerization of propylene and other α-olefin, such as ethylene, 1-butene, 4-methyl-1-pentene, 1-hexene, 1-pentene, 1-octene, and the like. The catalyst according to the invention is especially suitable for use in the polymerization of propylene or copolymerization of propylene and ethylene.

Thus, in the third aspect, the present invention relates to a process for (co)polymerizing olefin(s), comprising contacting ethylene or propylene and optional α-olefin comonomer(s) with the catalyst according to the invention under polymerization conditions.

The catalyst according to the invention is applicable to slurry polymerization process, bulk polymerization process, or gas phase polymerization process. These processes as well as their polymerization conditions are well known in the art.

In the fourth aspect, the present invention relates to use of the catalyst according to the invention in the (co)polymerization of olefin(s).

In the present invention, due to the use of the at least one surface modifier and the control of the content of alkoxy group derived from the surface modifier, performance of the catalyst is significantly improved. When used in polymerization of propylene or copolymerization of propylene with ethylene, the catalyst exhibits high catalytic activity and high impurity resistant ability; the catalyst has good particle morphology and narrow particle size distribution; the catalyst is applicable to various polymerization processes such as slurry process, bulk process, gas process, etc.; the resultant polymers have broader molecular weight distribution, Mw/Mn, better particle morphology, and less fines. The excellent impurity resistant ability of the catalyst may effectively reduce the production cost of resins. Furthermore, when used in copolymerization of propylene with ethylene, the catalyst exhibits excellent copolymerization performance so that the content of ethylene in the copolymer is higher. The catalyst is especially suitable for the production of impact resistant propylene copolymer and BOPP film grade resin.

EXAMPLES

The following examples are given for further illustrating the invention, but do not make limitation to the invention in any way.

The measurement of the content of alkoxy group derived from the surface modifier is as follows;

A sample of a powdery catalyst component was decomposed in deionized water so that the OR group in the sample was converted into ROH. Then gas chromatography was utilized to measure ROH in the water phase, thereby obtaining the content of OR.

Specifically, about 0.2 g of sample (with an accuracy of 0.0001 g) was weighed into a dry sample bottle, which had been purged with nitrogen. After adding 0.003 g of internal standard (about 6 μl, with an accuracy of 0.0001 g) thereto, 4 ml of deionized water was slowly injected thereto to decompose the catalyst component sample (when the catalyst component was decomposed by the addition of water, there is reaction heat released and thus the pressure was raised. Therefore, the plug of the sample bottle should be pressed and the sample bottle should be placed in a vessel contained water so as to make the bottle cooled quickly). The bottle was shaken for 2 to 3 minutes, and then made standing for more than 5 minutes. 0.5 μl of water phase was sampled for gas chromatography analysis.

Example 1

1. Preparation of Magnesium and Titanium-containing Solid 6.5 Kilograms of anhydrous magnesium dichloride, 132.7 liters of toluene, 5.4 liters of epoxy chloropropane, and 16.9 liters of tributyl phosphate were charged into a reactor which had thoroughly been purged with highly purified nitrogen. The reaction mixture was stirred at a temperature of 60° C. for 2.5 hours with the stirrer rotation speed being 130 rpm. Then 1.89 kg of phthalic anhydride was added to the reactor, and the reaction was continued for additional one hour. Then the mixture was cooled to −28° C., 56 Liters of titanium tetrachloride were added dropwise to the reactor, and the mixture was heated gradually to 85° C. and maintained at that temperature for one hour. The mother liquid was filtered off, and the residue solid was washed with toluene and subsequently hexane for several times and then dried, to give a magnesium and titanium-containing solid A.

2. Preparation of Solid Titanium-containing Catalyst Component

The solid A prepared above was suspended in toluene (93 liters), and 1.4 liters of ethanol and 48 liters of titanium tetrachloride were added thereto at −10° C., and the mixture was heated gradually to 110° C. with stirring. In the course of heating, 0.5 liters of diisobutyl phthalate (DIBP) were added at 20° C. and 2.0 liters of di-n-butyl phthalate (DNBP) were added at 80° C. The reaction mixture was maintained at 110° C. for one hour. Then, after filtering off liquid, 48 liters of titanium tetrachloride and 72 liters of toluene were added to the reactor, and the reaction mixture was maintained at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 2.58 wt % titanium, 7.63 wt % DNBP, 2.49 wt % DIBP, 1.5 wt % DEP (diethyl phthalate), and 0.17 wt % ethoxy, and had a specific surface area of 348 $m^2/g$, a pore volume of 0.32 $cm^3/g$, and a mean pore diameter of 3.78 nm.

3. Polymerization (1)

To a 5 L stainless steel autoclave, which had thoroughly been purged with nitrogen, were added 5 ml of 0.5 M solution of $AlEt_3$ in hexane, 1 ml of 0.1 M solution of cyclohexyl methyl dimethoxy silane (CHMMS) in hexane, and 10 mg of the catalyst component prepared above. Then 10 ml of hexane was added to rinse the addition line, followed by the introduction of 1 L (under normal conditions) of hydrogen and 2 L of purified propylene. The reactor was heated to 70° C., and the polymerization was performed at that temperature for two hours. Upon the completion of the reaction, the temperature of the reactor was reduced and the stirrer was stopped, then polymer product was discharged, After drying, 790 g of white polymer was obtained. The activity of the catalyst was 79000 g polypropylene per gram catalyst component, and the polymer had a bulk density of 0.46 g/cm$^3$, a content of fines passing 80 mesh sieve of 0.5 wt %, a molecular weight distribution (Mw/Mn) of 6.0, and a melt index (MI) of 6.7 g/10 min.

4. Polymerization (2)

To a 5 L stainless steel autoclave, which had thoroughly been purged with nitrogen, were added 10 ml of 0.5 M solution of AlEt$_3$ in hexane, 5 ml of 0.1 M solution of cyclohexyl methyl dimethoxy silane (CHMMS) in hexane, and 10 mg of the catalyst component prepared above. Then 10 ml of hexane were added to rinse the addition line, followed by the introduction of 5 L (under normal conditions) of hydrogen and 2 L of purified propylene. The reactor was heated to 70° C., and the polymerization was performed at that temperature for one hour. Then the pressure inside the reactor (gauge pressure) was reduced to 0. Then the reactor was heated to 80° C., and a gaseous mixture of hydrogen, ethyl, and propylene in the molar ratio of hydrogen to ethyl to propylene=0.005:1.0:1.25 was introduced to maintain a constant pressure of 1.0 MPa. The polymerization was performed at such conditions for 45 min. Then the polymer product was recovered. The activity of the catalyst was 83500 g polypropylene per gram catalyst component, and the polymer had a bulk density of 0.38 g/cm$^3$, a content of ethylene of 14.7 wt %, and a content of solubles in xylene of 21.1 wt %.

Example 2

1. Preparation of Magnesium and Titanium-containing Solid 4.8 Grams of anhydrous magnesium dichloride, 93 ml of toluene, 4.0 ml of epoxy chloropropane, and 12.5 ml of tributyl phosphate were charged into a reactor, which had thoroughly been purged with highly purified nitrogen. The mixture was stirred at a temperature of 60° C. for 2 hours with the stirrer rotation speed being 450 rpm. Then 1.4 g of phthalic anhydride was added to the reactor, and the reaction was continued for additional one hour. Then the reaction mixture was cooled to −28° C. 56 Milliliters of titanium tetrachloride were added dropwise to the reactor, and the mixture was heated gradually to 85° C. and maintained at that temperature for one hour. The mother liquid was filtered off, and the residue solid was washed with toluene and subsequently hexane for several times and then dried, to give a magnesium and titanium-containing solid A.

2. Preparation of Solid Titanium-containing Catalyst Component

The solid A prepared above was suspended in toluene (72 ml), and 1.7 m$^1$ of n-butanol and 48 ml of titanium tetrachloride were added thereto at −10° C., and the reaction mixture was heated gradually to 110° C. with stirring. In the course of heating, 1.5 ml of DNBP was added at 80° C. The reaction mixture was maintained at 110° C. for one hour. Then, after filtering off liquid, the residue solid was treated with 48 ml of titanium tetrachloride and 72 ml of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 2.13 wt % titanium, 12.8 wt % DNBP, and 0.1 wt % butoxy, and had a specific surface area of 282.1 m$^2$/g, a pore volume of 0.27 cm$^3$/g , and a mean pore diameter of 3.79 nm.

3. Polymerization (1)

The polymerization conditions were identical to that described for Polymerization (1) of Example 1. The activity of the catalyst was 68000 g polypropylene per gram catalyst component, and the polymer had a bulk density of 0.42 g/cm$^3$, a content of fines passing 80 mesh sieve of 1.0 wt %, a molecular weight distribution (Mw/Mn) of 5.2, and a melt index (MI) of 7.2 g/10 min.

4. Polymerization (2)

The polymerization conditions were identical to that described for Polymerization (2) of Example 1. The activity of the catalyst was 73600 g polypropylene per gram catalyst component, and the polymer had a bulk density of 0.37 g/cm$^3$, a content of ethylene of 13.3 wt %, and a content of solubles in xylene of 17.0 wt %.

Example 3

1. Preparation of Magnesium and Titanium-containing Solid

The procedure was identical to that as described in Example 2.

2. Preparation of Solid Titanium-containing Catalyst Component

The solid A prepared above was suspended in toluene (72 ml), and 3.0 ml of isooctanol was added thereto at 10° C., Then the reaction mixture was cooled to −10° C. and 48 ml of titanium tetrachloride were added thereto. The reaction mixture was heated gradually to 110° C., with 1.0 ml of DIBP being added at 80° C. The reaction mixture was maintained at 110° C. for one hour. Then, after filtering off liquid, the residue solid was treated with 48 ml of titanium tetrachloride and 72 ml of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 2.34 wt % titanium, 10.57 wt % DIBP, 0.8 wt % DIOP (diisooctyl phthalate), and 0.1 wt % octoxy, and had a specific surface area of 273.6 m$^2$/g, a pore volume of 0.26 cm$^3$/g, and a mean pore diameter of 3.78 nm.

3. Polymerization (1)

The polymerization conditions were identical to that described for Polymerization (1) of Example 1. The activity of the catalyst was 62300 g polypropylene per gram catalyst component, and the polymer had a bulk density of 0.46 g/cm$^3$, a content of fines passing 80 mesh sieve of 0.5 wt %, a molecular weight distribution (Mw/Mn) of 5.4, and a melt index (MI) of 5.8 g/10 min.

4. Polymerization (2)

The polymerization conditions were identical to that described for Polymerization (2) of Example 1. The activity of the catalyst was 55900 g polypropylene per gram catalyst component, and the polymer had a bulk density of 0.35 g/cm$^3$, a content of ethylene of 16.4 wt %, and a content of solubles in xylene of 21.2 wt %.

Example 4

1. Preparation of Magnesium and Titanium-containing Solid

The procedure was identical to that as described in Example 2.

2. Preparation of Solid Titanium-containing Catalyst Component

The solid A prepared above was suspended in toluene (72 ml), and 2.5 ml of isooctanol and 48 ml of titanium tetrachloride were added thereto at 0° C. The reaction mixture was heated gradually to 110° C., with 1.0 ml of DNBP being added at 80° C. The reaction mixture was maintained at 110° C. for one hour. Then, after filtering off liquid, the residue solid was treated with 48 ml of titanium tetrachloride and 72 ml of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 2.36 wt % titanium, 9.75 wt % DNBP, 0.65 wt % DIOP, and 0.12 wt % octoxy, and had a specific surface area of 245.3 m$^2$/g, a pore volume of 0.25 cm$^3$/g, and a mean pore diameter of 3.90 nm.

3. Polymerization (1)

The polymerization conditions were identical to that described for Polymerization (1) of Example 1. The activity of the catalyst was 77600 g polypropylene per gram catalyst component, and the polymer had a bulk density of 0.46 g/cm$^3$, a content of fines passing 80 mesh sieve of 0.3 wt %, a molecular weight distribution (Mw/Mn) of 5.1, and a melt index (MI) of 6.3 g/10 min.

4. Polymerization (2)

The polymerization conditions were identical to that described for Polymerization (2) of Example 1. The activity of the catalyst was 81400 g polypropylene per gram catalyst component, and the polymer had a bulk density of 0.38 g/cm$^3$, a content of ethylene of 13.0 wt %, and a content of solubles in xylene of 16.4 wt %.

Example 5

1. Preparation of Magnesium and Titanium-containing Solid

The procedure was identical to that as described in Example 1.

2. Preparation of Solid Titanium-containing Catalyst Component

The solid A prepared above was suspended in toluene (93 L), and 1.4 L of ethanol was added at −10° C. Then the reaction mixture was warmed gradually to 30° C. and maintained at that temperature for additional 30 min. Then the reaction mixture was cooled to −10° C., and 48 L of titanium tetrachloride was added thereto. The reaction mixture was heated gradually to 110° C., with 2.0 L of DNBP being added at 80° C. The reaction mixture was maintained at 110° C. for one hour. Then, after filtering off liquid, the residue solid was treated with 48 L of titanium tetrachloride and 72 L of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 2.56 wt % titanium, 8.64 wt % DNBP, 0.7 wt % DEP, and 0.24 wt % ethoxy, and had a specific surface area of 284.7 m$^2$/g, a pore volume of 0.27 cm$^3$/g, and a mean pore diameter of 3.53 nm.

3. Polymerization (1)

The polymerization conditions were identical to that described for Polymerization (1) of Example 1. The activity of the catalyst was 78000 g polypropylene per gram catalyst component, and the polymer had a bulk density of 0.47 g/cm$^3$, a content of fines passing 80 mesh sieve of 0.5 wt %, a molecular weight distribution (Mw/Mn) of 5.3, and a melt index (MI) of 5.6 g/10 min.

4. Polymerization (2)

The polymerization conditions were identical to that described for Polymerization (2) of Example 1. The activity of the catalyst was 81600 g polypropylene per gram catalyst component, and the polymer had a bulk density of 0.38 g/cm$^3$, a content of ethylene of 14.5 wt %, and a content of solubles in xylene of 19.3 wt %.

Example 6

1. Preparation of Magnesium and Titanium-containing Solid

The procedure was identical to that as described in Example 1.

2. Preparation of Solid Titanium-containing Catalyst Component

The solid A prepared above was suspended in toluene (93 L), and 1.4 L of ethanol was added at −10° C. Then the reaction mixture was warmed gradually to 30° C. and maintained at that temperature for additional 30 min. Then the reaction mixture was cooled to −10° C., and 48 L of titanium tetrachloride was added thereto. The reaction mixture was heated gradually to 110° C., with 1.7 L of DIBP being added at 80° C. The reaction mixture was maintained at 110° C. for one hour. Then, after filtering off liquid, the residue solid was treated with 48 L of titanium tetrachloride and 72 L of toluene at 110° C. for two hours, After filtering off liquid, the treatment was repeated for one times. Then the liquid was filtered off, and the residue solid product was washed with hexane for five times and then dried under reduced pressure, to give a solid titanium-containing catalyst component, which contained 2.56 wt % titanium, 7.83 wt % DIBP, 3.2 wt % DEP, and 0.15 wt % ethoxy, and had a specific surface area of 297.6 m$^2$/g, a pore volume of 0.29 cm$^3$/g, and a mean pore diameter of 3.49 nm.

3. Polymerization (1)

The polymerization conditions were identical to that described for Polymerization (1) of Example 1. The activity of the catalyst was 74000 g polypropylene per gram catalyst component, and the polymer had a bulk density of 0.47 g/cm$^3$, a content of fines passing 80 mesh sieve of 0.4 wt %, a molecular weight distribution (Mw/Mn) of 5.8, and a melt index (MI) of 5.8 g/10 min.

4. Polymerization (2)

The polymerization conditions were identical to that described for Polymerization (2) of Example 1. The activity of the catalyst was 63200 g polypropylene per gram catalyst component, and the polymer had a bulk density of 0.38 g/cm$^3$, a content of ethylene of 15.8 wt %, and a content of solubles in xylene of 22.32 wt %.

Example 7

1. Preparation of Magnesium and Titanium-containing Solid

The procedure was identical to that as described in Example 1.

2. Preparation of Solid Titanium-containing Catalyst Component

The solid A prepared above was suspended in toluene (93 L), and 1.4 L of ethanol was added at −25° C. Then the reaction mixture was warmed gradually to 30° C. and maintained at that temperature for additional 30 min. Then the reaction mixture was cooled to −10° C., and 48 L of titanium tetrachloride was added thereto. The reaction mixture was heated gradually to 110 C., with 4.5 L of 1,3-pentylene glycol dibenzoate being added at 40° C. The reaction mixture was maintained at 110° C. for one hour. Then, after filtering off liquid, the residue solid was treated with 48 L of titanium tetrachloride and 72 L of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 3.19 wt % titanium, 10.3 wt % 1,3-pentylene glycol dibenzoate, and 0.15 wt % ethoxy, and had a specific surface area of 283.5 $m^2/g$, a pore volume of 0.27 $cm^3/g$, and a mean pore diameter of 3.65 nm.

3. Polymerization (1)

The polymerization conditions were identical to that described for Polymerization (1) of Example 1. The activity of the catalyst was 61500 g polypropylene per gram catalyst component, and the polymer had a bulk density of 0.44 $g/cm^3$, a content of fines passing 80 mesh sieve of 0.4 wt %, a molecular weight distribution (Mw/Mn) of 8.5, and a melt index (MI) of 3.8 g/10 min.

4. Polymerization (2)

The polymerization conditions were identical to that described for Polymerization (2) of Example 1. The activity of the catalyst was 64800 g polypropylene per gram catalyst component, and the polymer had a bulk density of 0.37 $g/cm^3$, a content of ethylene of 14.9 wt %, and a content of solubles in xylene of 18.62 wt %.

Example 8

1. Preparation of Magnesium and Titanium-containing Solid

The procedure was identical to that as described in Example 1.

2. Preparation of Solid Titanium-containing Catalyst Component

The solid A prepared above was suspended in toluene (93 L), and 1.4 L of ethanol was added at 35° C. After the reaction mixture was maintained at that temperature for additional 30 min, 48 L of titanium tetrachloride was added thereto. The reaction mixture was heated gradually to 110° C., with 2.0 L of DIBP being added at 40° C. The reaction mixture was maintained at 110° C. for one hour. Then, after filtering off liquid, the residue solid was treated with 48 L of titanium tetrachloride and 72 L of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 3.27 wt % titanium, 6.80 wt % DIBP, 2.1 wt % DEP, and 0.14 wt % ethoxy, and had a specific surface area of 307.4 $m^2/g$, a pore volume of 0.29 $cm^3/g$, and a mean pore diameter of 4.09 nm.

3. Polymerization (1)

The polymerization conditions were identical to that described for Polymerization (1) of Example 1. The activity of the catalyst was 58000 g polypropylene per gram catalyst component, and the polymer had a bulk density of 0.45 $g/cm^3$, a content of fines passing 80 mesh sieve of 0.4 wt %, a molecular weight distribution (Mw/Mn) of 5.6, and a melt index (MI) of 5.4 g/10 min.

4. Polymerization (2)

The polymerization conditions were identical to that described for Polymerization (2) of Example 1. The activity of the catalyst was 62100 g polypropylene per gram catalyst component, and the polymer had a bulk density of 0.39 $g/cm^3$, a content of ethylene of 13.7 wt %, and a content of solubles in xylene of 16.86 wt %.

Example 9

1. Preparation of Magnesium and Titanium-containing Solid

The procedure was identical to that as described in Example 2.

2. Preparation of Solid Titanium-containing Catalyst Component

The solid A prepared above was suspended in toluene (72 ml), and 3.0 ml of ethanol and 48 ml of titanium tetrachloride were added thereto at −10° C., The reaction mixture was heated gradually to 110° C., with 1.0 ml of DIBP being added at 80° C. The reaction mixture was maintained at 110° C. for one hour. Then, after filtering off liquid, the residue solid was treated with 48 ml of titanium tetrachloride and 72 ml of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 2.85 wt % titanium, 11.5 wt % DIBP, and 1.3 wt % ethoxy, and had a specific surface area of 321.5 $m^2/g$, a pore volume of 0.30 $cm^3/g$, and a mean pore diameter of 3.62 nm.

3. Polymerization (1)

The polymerization conditions were identical to that described for Polymerization (1) of Example 1. The activity of the catalyst was 59400 g polypropylene per gram catalyst component, and the polymer had a bulk density of 0.43 $g/cm^3$, a content of fines passing 80 mesh sieve (sieve opening size 0.18 mm) of 2.4 wt %, a molecular weight distribution (Mw/Mn) of 5.6, and a melt index (MI) of 5.7 g/10 min.

Example 10

1. Preparation of Magnesium and Titanium-containing Solid 4.8 Grams of anhydrous magnesium dichloride, 93 ml of toluene, 4.0 ml of epoxy chloropropane, and 12.5 ml of tributyl phosphate were charged into a reactor, which had thoroughly been purged with highly purified nitrogen. The mixture was stirred at a temperature of 60° C. for 2 hours with the stirrer rotation speed being 450 rpm. Then 1.4 g of phthalic anhydride was added to the reactor, and the reaction was continued for additional one hour. Then the reaction mixture was cooled to −28° C., 56 Milliliters of titanium tetrachloride were added dropwise to the reactor, and the mixture was heated gradually to 85° C., with 0.5 ml of DNBP being added at 80° C. The reaction mixture was maintained at 85° C. for one hour. The mother liquid was filtered off, and the residue solid was washed with toluene and subsequently hexane for several times and then dried, to give a magnesium and titanium-containing solid A.

2. Preparation of Solid Titanium-containing Catalyst Component

The solid A prepared above was suspended in toluene (72 ml), and 1.0 ml of ethanol and 48 ml of titanium tetrachloride were added thereto at −10° C., and the reaction mixture was heated gradually to 110° C. with stirring. In the course of heating, 1.0 ml of DIBP was added at 80° C. The reaction mixture was maintained at 110° C. for one hour. Then, after filtering off liquid, the residue solid was treated with 48 ml of titanium tetrachloride and 72 ml of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 2.54 wt % titanium, 4.8 wt % DNBP, 6.9 wt % DIBP, 1.3 wt % DEP, and 0.20 wt % ethoxy, and had a specific surface area of 305.4 $m^2/g$, a pore volume of 0.28 $cm^3/g$, and a mean pore diameter of 3.64 nm.

3. Polymerization (1)

The polymerization conditions were identical to that described for Polymerization (1) of Example 1. The activity of the catalyst was 65000 g polypropylene per gram catalyst component, and the polymer had a bulk density of 0.47 $g/cm^3$, a content of fines passing 80 mesh sieve of 0.6 wt %, a molecular weight distribution (Mw/Mn) of 5.4, and a melt index (MI) of 6.9 g/10 min.

4. Polymerization (2)

The polymerization conditions were identical to that described for Polymerization (2) of Example 1. The activity of the catalyst was 71500 g polypropylene per gram catalyst component, and the polymer had a bulk density of 0.39 $g/cm^3$, a content of ethylene of 13.9 wt %, and a content of solubles in xylene of 16.8 wt %.

Example 11

1. Preparation of Magnesium and Titanium-containing Solid 4,8 Grams of anhydrous magnesium dichloride, 93 ml of toluene, 8.0 ml of epoxy chloropropane, and 10.0 ml of tributyl phosphate were charged into a reactor, which had thoroughly been purged with highly purified nitrogen. The mixture was stirred at a temperature of 60° C. for 2 hours with the stirrer rotation speed being 450 rpm. Then 1.4 g of phthalic anhydride was added to the reactor, and the reaction was continued for additional one hour. Then the reaction mixture was cooled to −28° C. 56 Milliliters of titanium tetrachloride were added dropwise to the reactor, and the mixture was heated gradually to 85° C. and maintained at that temperature for one hour. The mother liquid was filtered off, and the residue solid was washed with toluene and subsequently hexane for several times and then dried, to give a magnesium and titanium-containing solid A.

2. Preparation of Solid Titanium-containing Catalyst Component

The solid A prepared above was suspended in toluene (72 ml), and 1.0 ml of ethanol and 48 ml of titanium tetrachloride were added thereto at −10° C., and the reaction mixture was heated gradually to 110° C. with stirring. In the course of heating, 1.5 ml of DIBP was added at 80° C., The reaction mixture was maintained at 110° C. for one hour. Then, after filtering off liquid, the residue solid was treated with 48 ml of titanium tetrachloride and 72 ml of toluene at 110° C. for two hours. After filtering off liquid, the treatment was repeated for one times. Then the liquid was filtered off, and the residue solid product was washed with hexane for five times and then dried under reduced pressure, to give a solid titanium-containing catalyst component, which contained 3.12 wt % titanium, 15.7 wt % DIBP, 0.4 wt % DEP, and 0.18 wt % ethoxy, and had a specific surface area of 295.4 $m^2/g$, a pore volume of 0.28 $cm^3/g$, and a mean pore diameter of 3.70 nm.

3. Polymerization (1)

The polymerization conditions were identical to that described for Polymerization (1) of Example 1. The activity of the catalyst was 64000 g polypropylene per gram catalyst component, and the polymer had a bulk density of 0.47 $g/cm^3$, a content of fines passing 80 mesh sieve of 0.7 wt %, a molecular weight distribution (Mw/Mn) of 5.8, and a melt index (MI) of 6.4 g/10 min.

Example 12

1. Preparation of Magnesium and Titanium-containing Solid

The procedure was identical to that as described in Example 1.

2. Preparation of Solid Titanium-containing Catalyst Component

The solid A prepared above was suspended in toluene (93 L), and 1.4 L of ethanol was added at −25° C. Then the reaction mixture was warmed gradually to 30° C. and maintained at that temperature for additional 30 min. Then the reaction mixture was cooled to −10° C., and 48 L of titanium tetrachloride was added thereto. The reaction mixture was heated gradually to 110° C., with 1.5 L of DIBP and 1.8 L of ethyl benzoate (EB) being added at 40° C., The reaction mixture was maintained at 110° C. for one hour. Then, after filtering off liquid, the residue solid was treated with 48 L of titanium tetrachloride and 72 L of toluene at 110° C. for two hours. After filtering off liquid, the treatment was repeated for one times, Then the liquid was filtered off, and the residue solid product was washed with hexane for five times and then dried under reduced pressure, to give a solid titanium-containing catalyst component, which contained 2.1 wt % titanium, 4.2 wt % DIBP, 2.0 wt % EB, 0.8 wt % DEP, and 0.13 wt % ethoxy, and had a specific surface area of 304.3 $m^2/g$, a pore volume of 0.29 $cm^3/g$, and a mean pore diameter of 3.42 nm.

3. Polymerization (1)

The polymerization conditions were identical to that described for Polymerization (1) of Example 1. The activity of the catalyst was 64300 g polypropylene per gram catalyst component, and the polymer had a bulk density of 0.44 $g/cm^3$, a content of fines passing 80 mesh sieve of 0.4 wt %, a molecular weight distribution (Mw/Mn) of 6.3, and a melt index (MI) of 9.8 g/10 min.

4. Polymerization (2)

The polymerization conditions were identical to that described for Polymerization (2) of Example 1. The activity of the catalyst was 73200 g polypropylene per gram catalyst component, and the polymer had a bulk density of 0.36 g/cm$^3$, a content of ethylene of 14.5 wt %, and a content of solubles in xylene of 18.5 wt %.

Comparative Example 1

1. Preparation of Solid Titanium-containing Catalyst Component 4.8 Grams of anhydrous magnesium dichloride, 93 ml of toluene, 4.0 ml of epoxy chloropropane, and 12.5 ml of tributyl phosphate were charged into a reactor, which had thoroughly been purged with highly purified nitrogen. The mixture was stirred at a temperature of 60° C. for 2 hours with the stirrer rotation speed being 450 rpm. Then 1.4 g of phthalic anhydride was added to the reactor, and the reaction was continued for additional one hour. Then the mixture was cooled to −28° C. 56 Ml of titanium tetrachloride was added dropwise to the reactor, and the mixture was heated gradually to 85° C. with 2.0 ml of DNBP being added at 80° C. The mixture was maintained at 85° C. for one hour. The mother liquid was filtered off, and the residue solid was treated with 40 ml of titanium tetrachloride and 60 ml of toluene at 110° C. for two hours. After filtering off liquid, the treatment was repeated for one times. Then the liquid was filtered off, and the residue solid was washed with hexane for five times and then dried, to give a solid titanium-containing catalyst component, which contained 1.9 wt % titanium, 12.50 wt % DNBP, and 0 wt % ethoxy, and had a specific surface area of 180.5 m$^2$/g, a pore volume of 0.22 cm$^3$/g, and a mean pore diameter of 4.12 nm.

2. Polymerization (1)

The polymerization conditions were identical to that described for Polymerization (1) of Example 1. The activity of the catalyst was 55000 g polypropylene per gram catalyst component, and the polymer had a bulk density of 0.47 g/cm$^3$, a content of fines passing 80 mesh sieve of 1.5 wt %, a molecular weight distribution (Mw/Mn) of 4.3, and a melt index (MI) of 4.5 g/10 min.

3. Polymerization (2)

The polymerization conditions were identical to that described for Polymerization (2) of Example 1. The activity of the catalyst was 46200 g polypropylene per gram catalyst component, and the polymer had a bulk density of 0.35 g/cm$^3$, a content of ethylene of 9.5 wt %, and a content of solubles in xylene of 13.8 wt %.

Comparative Example 2

1. Preparation of Magnesium and Titanium-containing Solid

The procedure was identical to that as described in Example 2.

2. Preparation of Solid Titanium-containing Catalyst Component

The solid A prepared above was suspended in toluene (72 ml), and 8.0 ml of ethanol and 48 ml of titanium tetrachloride were added thereto at −10° C. The reaction mixture was heated gradually to 85° C., with 1.0 ml of DIBP being added at 80° C. The reaction mixture was maintained at 85° C. for one hour. Then the liquid was filtered off, and the residue solid product was washed with hexane for five times and then dried under reduced pressure, to give a solid titanium-containing catalyst component, which contained 4.32 wt % titanium, 13.5 wt % DIBP, and 5.5 wt % ethoxy, and had a specific surface area of 170.6 m$^2$/g, a pore volume of 0.22 cm$^3$/g, and a mean pore diameter of 4.65 nm.

3. Polymerization (1)

The polymerization conditions were identical to that described for Polymerization (1) of Example 1. The activity of the catalyst was 36400 g polypropylene per gram catalyst component, and the polymer had a bulk density of 0.43 g/cm$^3$, a content of fines passing 80 mesh sieve (sieve opening size 0.18 mm) of 5.6 wt %, a molecular weight distribution (Mw/Mn) of 5.3, and a melt index (MI) of 6.2 g/10 min.

Comparative Example 3

1. Preparation of Solid Titanium-containing Catalyst Component 4.8 Grams of anhydrous magnesium dichloride, 93 ml of toluene, 4.0 ml of epoxy chloropropane, 12.5 ml of tributyl phosphate, and 1 ml of ethanol were charged into a reactor, which had thoroughly been purged with highly purified nitrogen. The mixture was stirred at a temperature of 60° C. for 2 hours with the stirrer rotation speed being 450 rpm. Then 1.4 g of phthalic anhydride was added to the reactor, and the reaction was continued for additional one hour. Then the mixture was cooled to −28° C. 56 Ml of titanium tetrachloride was added dropwise to the reactor, and the mixture was heated gradually to 85° C. with 2.0 ml of DNBP, being added at 80° C. The mixture was maintained at 85° C. for one hour. The mother liquid was filtered off, and the residue solid was treated with 40 ml of titanium tetrachloride and 60 ml of toluene at 110° C. for two hours. After filtering off liquid, the treatment was repeated for one times. Then the liquid was filtered off, and the residue solid was washed with hexane for five times and then dried, to give a solid titanium-containing catalyst component, which contained 3.56 wt % titanium, 12.20 wt % DNBP, and 0.30 wt % ethoxy, and had a specific surface area of 150.4 m$^2$/g, a pore volume of 0.21 cm$^3$/g, and a mean pore diameter of 4.23 nm.

2. Polymerization (1)

The polymerization conditions were identical to that described for Polymerization (1) of Example 1. The activity of the catalyst was 25300 g polypropylene per gram catalyst component, and the polymer had a bulk density of 0.43 g/cm$^3$, a content of fines passing 80 mesh sieve of 10.2 wt %, a molecular weight distribution (Mw/Mn) of 4.8, and a melt index (MI) of 4.9 g/10 min.

What is claimed is:

1. A catalyst component for olefin (co)polymerization comprising magnesium, titanium, halogen, an inner electron donor compound selected from the group consisting of polycarboxylic acids, esters of mono-carboxylic acids and polycarboxylic acids, anhydrides, ketones, mono-ethers, poly-ethers, and amines, and an alkoxy group derived from a surface modifier selected from the group consisting of alcohols, wherein the content of alkoxy group derived from the surface modifier is in a range of from 0.01 to 3 percent by weight, based on the weight of the catalyst component.

2. A process for preparing the catalyst component for olefin (co)polymerization according to claim 1, comprising the steps of:

i) dissolving a magnesium compound in a solvent mixture consisting of an organic epoxy compound, an organic phosphorus compound and an optional inert diluent, to form a homogeneous solution;

ii) treating the above solution with a titanium compound in the presence of an auxiliary precipitant, and optionally in the presence of at least one inner electron donor compound, to precipitate a solid precipitate containing magnesium and titanium;

iii) treating the solid precipitate with at least one surface modifier, and at the same time or subsequently, supporting at least one titanium compound and at least one inner electron donor compound thereon, to form a treated solid precipitate; and iv) washing the treated solid precipitate with an inert diluent, wherein the surface modifier is selected from the group consisting of alcohols, and wherein the auxiliary precipitant is at least one selected from the group consisting of carboxylic acid anhydrides, carboxylic acids, ethers and ketones.

3. A catalyst for olefin (co)polymerization, comprising
A) the catalyst component according to claim 1,
B) an organic aluminum compound, and
C) optionally, an external electron donor compound.

4. A process for (co)polymerizing olefin(s), comprising contacting ethylene or propylene and optional α-olefin comonomer(s) with the catalyst according to claim 3 under polymerization conditions.

5. The process according to claim 4, which is carried out in slurry phase, bulk phase, or gas phase.

6. A catalyst component for olefin (co)polymerization, which is obtained by a process comprising the steps of:

i) dissolving a magnesium compound in a solvent mixture consisting of an organic epoxy compound, an organic phosphorus compound and an optional inert diluent, to form a homogeneous solution;

ii) treating the above solution with a titanium compound in the presence of an auxiliary precipitant, and optionally in the presence of at least one inner electron donor compound, to precipitate a solid precipitate containing magnesium and titanium;

iii) treating the solid precipitate with at least one surface modifier, and at the same time or subsequently, supporting at least one titanium compound and at least one inner electron donor compound thereon, to form a treated solid precipitate; and iv) washing the treated solid precipitate with an inert diluent;

wherein the surface modifier is selected from the group consisting of alcohols, wherein the auxiliary precipitant is at least one selected from the group consisting of carboxylic acid anhydrides, carboxylic acids, ethers and ketones, and wherein the catalyst component comprises alkoxy group derived from the surface modifier in an amount of from 0.01 to 3 percent by weight, based on the weight of the catalyst component.

7. The catalyst component according to claim 6, wherein the surface modifier is selected from the group consisting of linear alcohols having 1 to 8 carbon atoms and isomer alcohols thereof.

8. The catalyst component according to claim 6, wherein the surface modifier is methanol, ethanol, propanol, isopropanol, butanol, isobutanol, octanol, isooctanol, or mixture thereof.

9. The catalyst component according to claim 6, wherein the magnesium compound is selected from the group consisting of magnesium dihalides, complexes of magnesium dihalide with water or alcohol, derivatives of magnesium dihalide wherein a halogen atom is replaced with a hydrocarbyl group or a hydrocarbyloxy group, and mixtures thereof, and wherein the titanium compound has a general formula $Ti(OR)_{4-n}X_n$, in which R is $C_1$-$C_{14}$ aliphatic hydrocarbyl or aromatic hydrocarbyl being identical or different, X is halogen, and n is an integer of from 0 to 4.

10. The catalyst component according to claim 9, wherein the magnesium compound is magnesium dichloride, and wherein the titanium compound is titanium tetrachloride.

11. The catalyst component according to claim 6, wherein the inner electron donor compound is selected from the group consisting of diethyl phthalate, diisobutyl phthalate, di-n-butyl phthalate, diisooctyl phthalate, di-n-octyl phthalate, diethyl malonate, dibutyl malonate, diethyl 2,3-diisopropylsuccinate, diisobutyl 2,3-diisopropylsuccinate, di-n-butyl 2,3-diisopropylsuccinate, dimethyl 2,3-diisopropylsuccinate, diisobutyl 2,2-dimethylsuccinate, diisobutyl 2-ethyl-2-methylsuccinate, diethyl 2-ethyl-2-methylsuccinate, diethyl adipate, dibutyl adipate, diethyl sebate, dibutyl sebate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl pyromellitate, tetrabutyl pyromellitate, 1,3-pentylene glycol dibenzoate, ethyl benzoate, and mixtures thereof.

12. The catalyst component according to claim 6, wherein the inert diluent is hexane, heptane, octane, decane, benzene, toluene, or xylene.

13. The catalyst component according to claim 6, wherein the surface modifier is used in an amount of from 0.06 to 10 moles, based on per mole of the magnesium compound.

14. The catalyst component according to claim 6, wherein the inner electron donor compound is used in an amount of from 0.01 to 2 moles, based on per mole of the magnesium compound.

15. The catalyst component according to claim 6, wherein the content of the alkoxy group derived from the surface modifier is in a range of from 0.02 to 2 percent by weight, based on the weight of the catalyst component.

16. A catalyst for olefin (co)polymerization, comprising
A) the catalyst component according to claim 6,
B) an organic aluminum compound, and
C) optionally, an external electron donor compound.

17. A process for (co)polymerizing olefin(s), comprising contacting ethylene or propylene and optional α-olefin comonomer(s) with the catalyst according to claim 16 under polymerization conditions.

18. The process according to claim 17, which is carried out in slurry phase, bulk phase, or gas phase.

19. A catalyst component for olefin (co)polymerization comprising magnesium, titanium, chlorine, an inner electron donor compound selected from the group consisting of polycarboxylic acids, esters of mono-carboxylic acids and polycarboxylic acids, anhydrides, ketones, mono-ethers and poly-ethers, and amines, and a ($C_1$-$C_8$)alkoxy group derived from a surface modifier selected from the group consisting of $C_1$-$C_8$ alcohols, wherein the content of the alkoxy group derived from the surface modifier is in a range of from 0.01 to 3 percent by weight, based on the weight of the catalyst component, said catalyst component being obtained by a process comprising the steps of:

i) dissolving magnesium dichloride in a solvent mixture consisting of an organic epoxy compound, an organic phosphorus compound and an optional inert diluent, to form a homogeneous solution;

ii) treating the above solution with titanium tetrachloride in the presence of at least one auxiliary precipitant selected from the group consisting of carboxylic acid anhydrides, carboxylic acids, ethers and ketones, and optionally in the presence of at least one inner electron donor compound, to precipitate a solid precipitate containing magnesium and titanium;

iii) treating the solid precipitate with the at least one surface modifier, and at the same time or subsequently, supporting titanium tetrachloride and at least one inner electron donor compound thereon, to form a treated solid precipitate; and iv) washing the treated solid precipitate with an inert diluent.

\* \* \* \* \*